Figure 3:
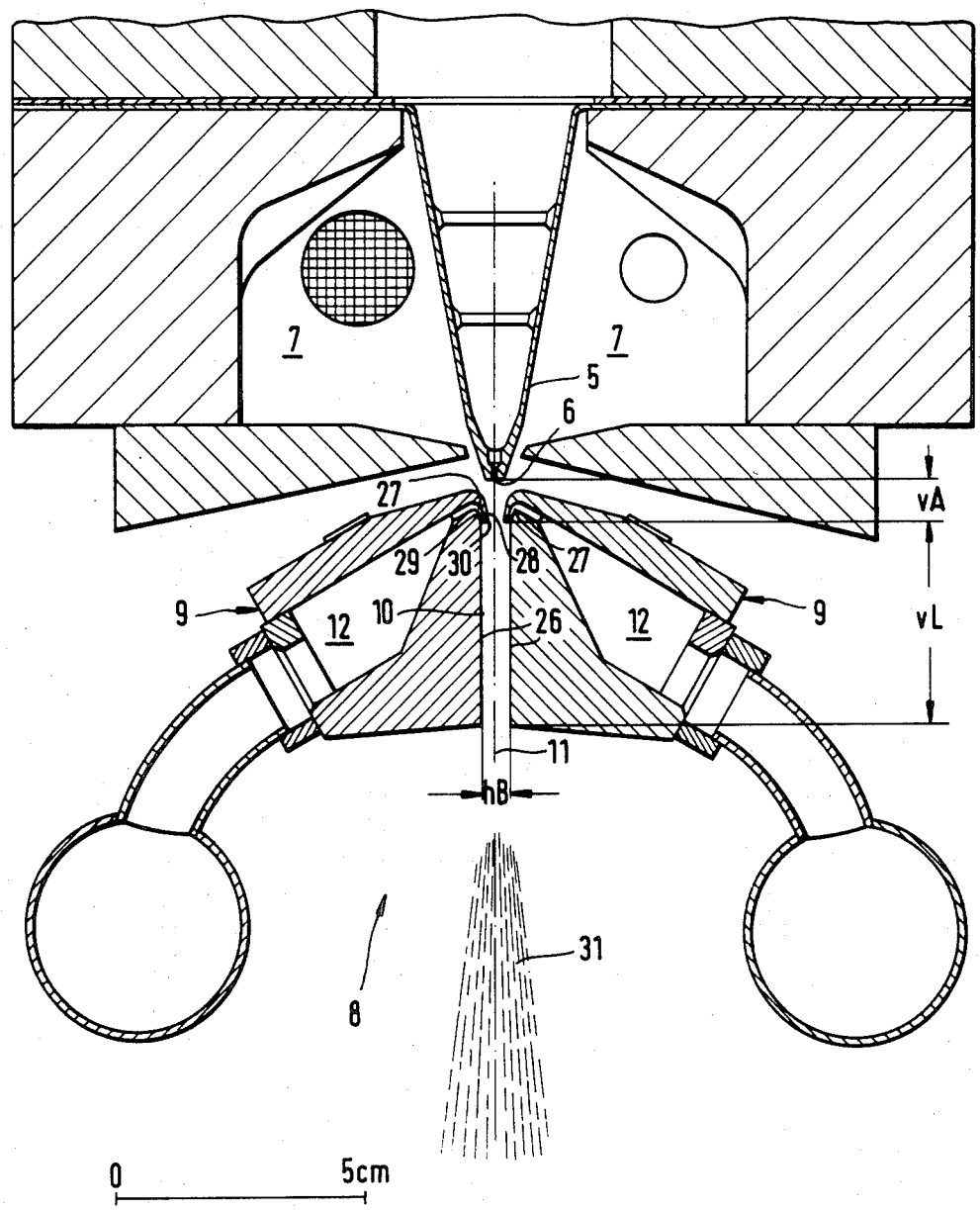

United States Patent [19]

Fachat et al.

[11] Patent Number: 4,698,086
[45] Date of Patent: Oct. 6, 1987

[54] APPARATUS FOR PRODUCING MINERAL FIBRES FROM MOLTEN SILICATE BY BLAST DRAWING

[75] Inventors: Gaston Fachat, Ladenburg; Klaus Sistermann, Neustadt; Heinz-Jürgen Ungerer, Viernheim, all of Fed. Rep. of Germany

[73] Assignee: Grunzweig & Hartmann und Glasfaser AG, Fed. Rep. of Germany

[21] Appl. No.: 839,225

[22] Filed: Mar. 13, 1986

[30] Foreign Application Priority Data

Mar. 15, 1985 [DE] Fed. Rep. of Germany ....... 3509426

[51] Int. Cl.$^4$ .............................................. C03B 37/06
[52] U.S. Cl. ............................................. 65/16; 65/5; 65/19
[58] Field of Search ....................... 65/4.4, 7, 19, 11.1, 65/8, 15; 156/62.4

[56] References Cited

U.S. PATENT DOCUMENTS

| 3,352,653 | 11/1967 | Speth | 65/16 X |
|---|---|---|---|
| 3,547,610 | 12/1970 | Holman | 65/7 |
| 4,487,622 | 12/1984 | Battigelli et al. | 65/4.4 |
| 4,539,029 | 9/1985 | Muschelknautz et al. | 65/16 X |
| 4,553,996 | 11/1985 | Muschelknautz et al. | 65/4.4 |

FOREIGN PATENT DOCUMENTS 724314 2/1955 United Kingdom .................... 65/16

Primary Examiner—Robert L. Lindsay
Attorney, Agent, or Firm—Finnegan, Henderson, Farabow, Garrett & Dunner

[57] ABSTRACT

To produce basalt wool having a large fibre diameter of if desired 10 μm with high output and low bead formation, the exit cross-section of the exit orifices (6) of the distributor tank (5), the vertical distance (vA) between the exit orifices (6) and the blow-in slits (29) for propellant gas, the horizontal width (hB) of the nozzle slot (10) and the vertical length (vL) of the nozzle slot (10) downstream of the blow-in slits (29) are dimensioned to be unusually large for an apparatus for producing rock fibres by blast drawing. As a result, it is possible to operate at a low melt temperature and a high propellant gas rate combined with a low propellant gas pressure in order, surprisingly, to obtain a coarse-fibered product with low bead formation and high output. In the area of the blow-in slits (29) the airguide lips (28) advantageously form an abruptly terminated slot constriction in order to assist the fiberization therein and to utilize the subsequent long vertical length (vL) of the nozzle slot (10) in full for fiber drawing without thereby incurring marked bead formation.

2 Claims, 3 Drawing Figures

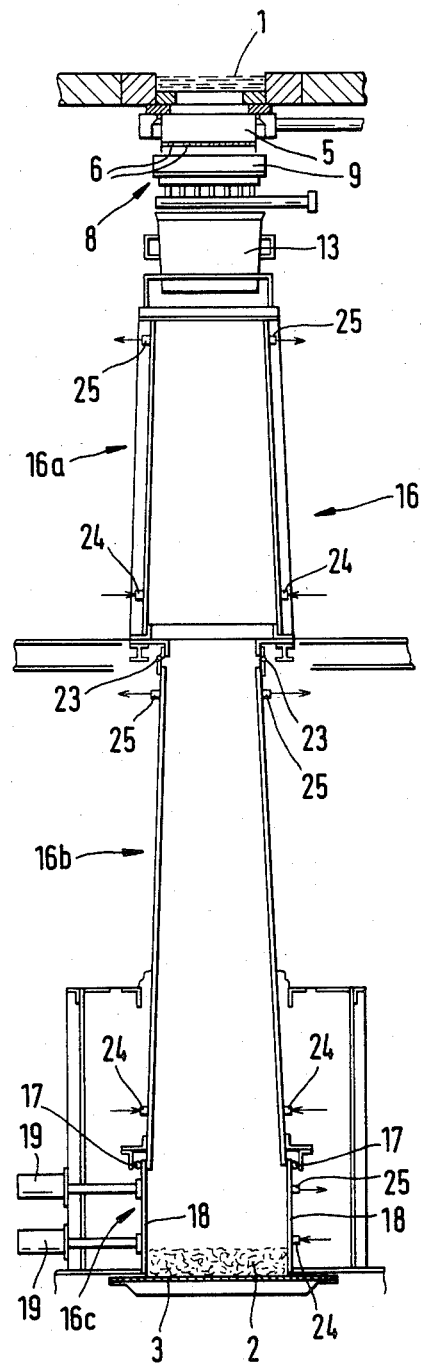
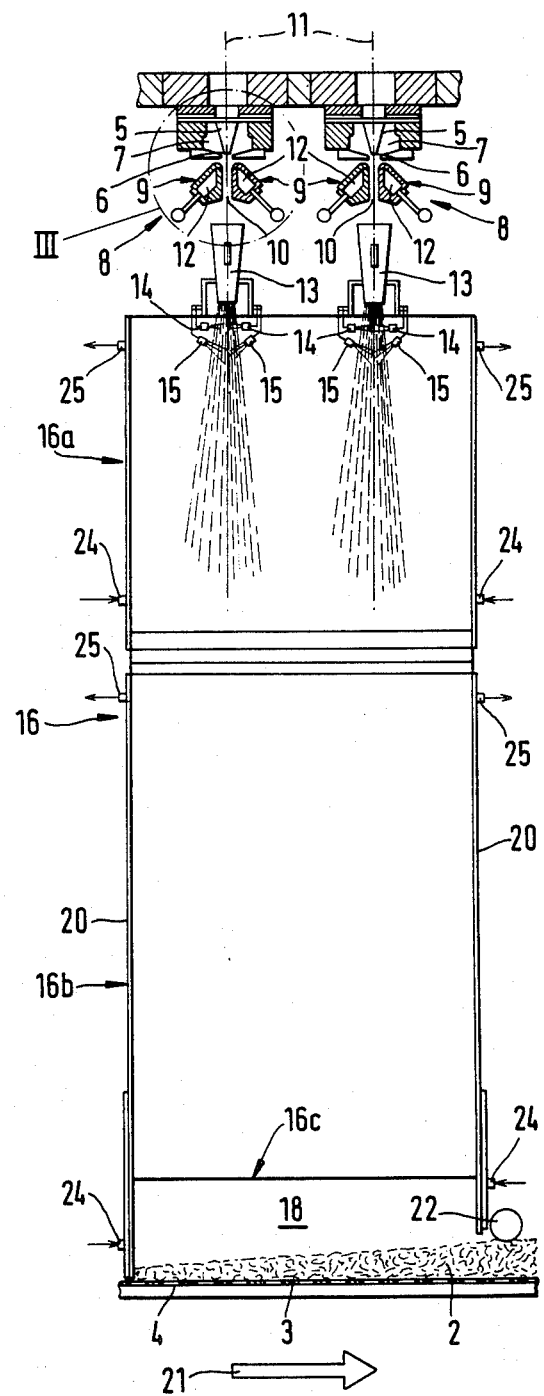

APPARATUS FOR PRODUCING MINERAL FIBRES FROM MOLTEN SILICATE BY BLAST DRAWING

The invention relates to an apparatus for producing mineral fibres from silicate raw materials, in particular basalt having a modular modulus of viscosity of at least 1.4, preferably of at least 1.5, by blast drawing defined in the preamble of claim 1.

The term "modular modulus of viscosity" used above is a customary term in the glass industry is to be understood as meaning the dimensionless quotient of the following customary components of a basalt rock:

$$m = \frac{SiO_2 + 2Al_2O_3}{TiO_2 + 2Fe_2O_3 + CaO + MgO + Na_2O + K_2O}$$

where the components are to be inserted in moles.

This parameter is representative of a necessary temperature dependence of the viscosity in the fiberisation stage of the blast drawing process. It is also a measure of the crystallisation temperature, which should be as low as possible.

In the case of such an apparatus, the intention is generally to produce particularly fine and long mineral fibres in which the content of undrawn residues, so-called beads, is as small as possible. For this purpose, the slot between the two blast nozzle halves which forms a fiberisation duct is constructed to be as narrow as is compatible with the formation of the necessary flow profile in the duct for drawing out and stretching the fibres. It has been found that widening the slot, as for example when thicker primary filaments are used with the intention of increasing the output, rapidly leads to an increase of the bead content, which phenomenon is presumably due to an uncontrolled increase in pressure in the area of the outlet from the blast nozzle arrangement. It has also been found that at high temperatures (about 1400° C.) of the primary filament preferentially short but fine filaments having a thickness of a few $\mu m$ are formed at the exit orifices from the distributor tank, while at lower temperature (about 1330° C.) the filaments obtained tend to be longer and thicker but to contain a markedly higher bead content. Furthermore, when the melt temperature is lowered the output inevitably drops due to the reduced (as a consequence of the higher viscosity) outflow rate of the melt from the exit orifices.

Whereas for most applications the production of the finest possible wool is desirable in any case, this being generally possible with relatively low bead contents at high output, there are on the other hand also applications where relatively thick filaments of sizeable length are desirable, provided these can be obtained substantially bead-free and with high productivity. Such an application is for example the manufacture of inserts for exhaust silencers such as automotive exhaust mufflers, where good blow-out properties of the wool are of central importance. Since the fiberisation process in blast drawing is controlled by a large number of factors which interact in a very complex manner, a changeover of the production to the production of fibres for, for example, silencers introduces considerable problems and is not possible with satisfactory quality or productivity.

In contrast, it is the object of the invention to provide an apparatus for producing mineral fibres which permits substantially bead-free production of long and relatively thick fibres having a thickness of if desired far above 10 $\mu m$ with high productivity, that is to say with high output.

The first result thereof is to increase the exit cross-section of the exit orifices of the distributor tank, which is customarily about 2 $mm^2$, which corresponds to a diameter of about 1.5 mm for a circular exit orifice, by a marked extent, so that the product even at low melt temperature is a thick primary filament as a first prerequisite for a high output. The effect of the additional enlargement effected of the vertical distance between the exit orifices of the distributor tank and the blow-in slits for propellant gas, generally air, is a comparatively long path along which the thick primary filament is exposed to the cooling action and the pre-drawing friction of the secondary air stream, which is drawn from above into the nozzle slot together with the primary filament by the propellant gas stream in the manner of an injector. Whereas the cooling action is fully effective, the predrawing friction of the secondary air stream is of only minor effectiveness in view of the large dimensions of the width of the nozzle slot, so that the material of the primary filament reaches the level of the blow-in slits when already relatively cold but while still relatively thick. A further conceivable measure is to introduce cold propellant gas to the nozzle slot. In any case it is possible to use a comparatively high propellant gas rate under a low blasting pressure corresponding to a back-pressure of less than 3 bar, so that the fiberisation is initiated with the largest possible amount of propellant gas which in the manner known per se, namely as a consequence of the velocity profile resulting in the nozzle slot, produces a lateral deflection of the primary filament and its splitting into individual filaments, which are then further drawn out by loop formation. These actions of the flows in the nozzle slot act on the melt for a long pathway in view of the large vertical length of the nozzle slot, so that despite relatively strong precooling and so to speak "cold fiberisation" the fibres formed are thick, having a diameter of 10 um or more. It has been found in this context, surprisingly, that bead formation does not occur to any significant extent, as ought to have been feared in view of the large width of the slot, since as a consequence of the relatively low propellant gas velocities it is possible to obtain problem-free operation with amounts of propellant gas which are sufficiently large as to ensure satisfactory discharge of the flow from the exit end of the nozzle slot without uncontrolled pressure surges.

In the particularly preferred embodiment, air guide lips of the blow-in slits markedly constrict the nozzle slot in places. As a result, there is at the level of the blow-in slits a marked jump in pressure which appears to divide the thick, relatively cold primary filament into individual filaments very abruptly despite the low viscosity and high thickness of said primary filament, and these individual filaments can then be drawn along the relatively long remaining pathway in the nozzle slot to the desired extent until bead-free. The use of air guide lips or of other internal constrictions of the blow-in slit for the formation of a pronounced local constriction of the cross-section is at odds with the customary procedure wherein an attempt is made to keep the effect on the flow by the blow-in slits as small as conceivably possible; for this purpose, the blow-in slits have even been completely taken out of the area of the nozzle slot in order to be able to feed in the propellant gas without any mechanical interference in the nozzle slot whatsoever, by solely utilising the Coanda wall effect (cf. for example German Pat. No. 1,190,135).

Further details, features and advantages of the invention will be apparent from the following description of an embodiment thereof by reference to the drawings, in which FIG. 1 shows an apparatus according to the invention in a schematic front view, FIG. 2 shows the apparatus of FIG. 1 in a side view and FIG. 3 shows the detail of circle III in FIG. 2 in life size.

As FIGS. 1 and 2 show, an apparatus according to the invention serves for converting a mineral melt, signified by 1, in the top part of the apparatus into mineral fibres which are deposited onto a conveyor belt 3 for the formation of a continuous mineral fibre web 2 which is transported away, in the drawing of FIG. 2 towards the right-hand side. As indicated in FIG. 2, the conveyor belt 3 has perforations 4 through which air or gas can be sucked downward as is customary per se in the production of mineral fibres, in an unspecified manner.

The melt 1 from a melt tank (not depicted) is fed for example to two distributor tanks 5 which are arranged side by side and which each have a number of exit orifices 6 for melt. The distributor tanks 5 are made of platinum in conventional and known manner and are maintained at a desired temperature by means of flames in lateral hollow spaces 7.

As is in principle likewise customary with blast drawing, there are arranged beneath the exit orifices 6 blast nozzle means 8 which each consist of two blast nozzle halves 9 and, arranged therebetween, a nozzle slot 10 through which primary filaments of melt emerging from the exit orifices 6 appear in correspondence with the plumb lines 11 shown in FIG. 2 and are simultaneously fiberised by means of propellant gas which is provided under superatmospheric pressure in hollow spaces 12 of the blast nozzle halves and is blown into the nozzle slot 10 by way of blow-in slits not visible in FIGS. 1 and 2. The basic processes which take place in this process of fiberisation are familiar to the person skilled in the art.

The—as drawn—lower exit side of the blast nozzle means 8 sees the emergence of a flow bundle 31 (cf. FIG. 3) which contains the propelent gas; secondary air attracted from the upper side of the blast nozzle unit 8 by the injector action of the blown-in propellant gas; together with combustion off-gases from the hollow spaces 7 and the freshly formed fibres at still high temperatures. The flow bundle 31 arrives in the guide cells 13 which are convergent in nozzle-like fashion, as a result of which further secondary air is attracted once more on their upper side for further cooling, and the resulting fibre-gas mixture emerges from the exit of the guide cells 13 with renewed bundling into a flow bundle again. Owing to the elongated shape of the nozzle slots 10 and guide cells 13, the flow bundles are naturally of a coresponding elongated shape and merely act as slender circular cones in a view corresponding to FIG. 2 or 3. In the region of the lower end of the guide cells 13 there are spray nozzles 14 for injecting cooling liquid such as cooling water and spray nozzles 15 for injecting binder such as phenolic resin in fluent consistency. That is also the entry zone of a chute which is signified as a whole by 16 and which has, arranged on top of one another, a first chute section 16a, a second chute section 16b and a third chute section 16c. In the interior of the chute 16 the descending fibres cool down further and become distributed across the cross-section of the chute, so that the result is uniform deposition as a web 2 on conveyor belt 3, and the entrained gases carried over into the chute 16 are evacuated away in the known manner already indicated above.

The lower chute section 16c of chute 16 has movable side walls 18 which are for example adjustable in their position through parallel shifting by way of adjusting members 19 and are connected to the adjoining walls of the middle chute section 16b by means of catches 17 and, as is clear from FIG. 1, bound the side edges of the web. As is clear in the drawing from the cut-away representation of the area of the chute 16, the front walls 20 of the middle chute section 16b extend into the area of the lower chute section 16c and thus also form the front walls of that section as well. The front walls 20 of the entire chute 16 are arranged to be rigid, and the front wall which is to the rear in relation to arrow 21 which indicates the transport direction is correspondingly shorter to accommodate the height of the mineral fibre web 2, so that the mineral fibre web 2 can emerge from the area of the chute 16, and during emergence is simultaneously subjected to the application of pressure and height levelling by a likewise cooled roll 22.

It is true that in this way some of the circumferential walls of the chute 16 are movable, like for example the side walls 18 of the lowest chute section 16c through parallel shifting and if required likewise the side walls of the middle chute section 16b through pivoting movement about hinges 23, but all the circumferential walls as such are constructed to be rigid, that is to say have no possible movement for continuous self-cleaning or the like. On the other hand, however, all the circumferential walls of the chute 16 are constructed to be jacketed, the resulting hollow spaces being filled with cooling liquid which in each case is suppliable through connections 24 and dischargeable through connections 25.

As to further details, features and advantages of the guide cells 13 and the injection thereinto of water and binder on the one hand and the construction of the chute 16 on the other, express reference is made to the full content of the two parallel German patent applications of the same applicant and of the same date entitled "Apparatus for producing mineral fibres from silicate raw materials such as basalt by blast drawing" and "Apparatus for producing mineral fibres from silicate raw materials such as basalt, in particular by blast drawing" respectively under patent agent Folio Nos. 11 GH04 41 and 11 GH04 42 respectively.

The area of the blast nozzle unit 8 is depicted in FIG. 3 with further details, this part of the apparatus according to the invention being reproduced in FIG. 3, as is clear from the depicted scale, in life size.

The fundamental structure of the blast nozzle unit 8 and of the distributor tank 5 having the exit orifice 6 has already been explained above. As is clear from the magnified representation in FIG. 3, the nozzle slot 10 has parallel walls 26 the upper end of which has a rounding 27. The rounding 27 is overlapped by an air guide lip 28 which leaves a clear space in the direction of the adjacent slot wall 26 for a blow-in slit 29 whose rearward end is connected to an associated hollow space 12 for compressed air or compressed gas. In this way, a velocity profile of high velocity is obtained in the area of the slot walls 26 and of lower velocity in the middle area of the nozzle slot 10. The interaction thereof with the melt produces the necessary loop formation for fiberisation, as is known per se.

The exit cross-section of the exit orifices 6 of the distributor tank 5 may be for example 3.1 mm², which is a very high value compared with conventional exit cross-sections. As a result, melt can flow out of the distributor tank 5 in a sufficient amount even at relatively low temperature of around 1330° C. and a consequently low viscosity and be exposed to fiberisation. The vertical distance vA between the exit orifice 6 and the blow-in slits 29, which are at the same level, is 11 mm and is consequently likewise unusually high. As a result, further cooling down of the primary filament is obtained up to fiberisation at the level of the blow-in slits 29. The horizontal width hB of the nozzle slot 10 is for example 12 mm, that is to say likewise a very high value, the first consequence of which is that the secondary flow sucked in together with the primary filament will exert further effective cooling on the primary filament without, however, predrawing it by much, since for the latter purpose the flow velocity remains too low. Thus, a relatively thick but relatively cold primary filament arrives in the area of the blow-in slits 27. There the air guide lips project into the free slot cross-section, thus constricting the slot width hB of the nozzle slot, and preferably end in a relatively sharp outside edge 30, so that the result is an accentuated change in flow resulting in a jump in pressure.

This pressure jump gives lasting support to the immediate disintegration of the compact cold primary filament in the sense of a "cold fiberisation", after which, in correspondence with the length of the downstream nozzle slot vL, a length of for example 40 mm, which is again unusually high, is available for complete fiberisation. In view of the excellent precooling, there is virtually no bead formation despite the long fiberisation section. Furthermore, it is possible to use a relatively low air velocity and a high amount of air from the blow-in slits 29, so that it is also possible to avoid pressure surges at the exit of the nozzle slot 10, which would again favour bead formation.

The flow bundle 31 emerging from the nozzle slot 19 thus contains fibres having a large diameter of if desired more than 10 μm and of appreciable length with minimal bead formation, the output being perfectly satisfactory in view of the outflow quantity which is high, despite the low viscosity, as a result of the large dimensions of the exit orifices 6.

What is claimed is:

1. An apparatus for producing mineral fibers from a melt of silicate materials having a modular modulus of viscosity of at least 1.4 by blast drawing, said apparatus comprising:

a melt tank for holding said molten silicate materials;
   at least one distributor tank in flow communication with said melt tank, said distributor tank having a plurality of exit orifices for forming primary filaments of melt, said orifices having cross-sectional areas in the range of from 1.5 to 3.5 mm²;
   a blast nozzle unit disposed beneath said exit orifices at a distance therefrom, in flow communication therewith for receiving said primary filaments, and symmetrical relative to the plumb line of said primary filaments emerging from said exit orifices, said nozzle unit comprising two blast nozzle halves bounding a nozzle slot therebetween to accommodate a plurality of parallel incoming primary filaments, each of said halves having a blow-in slit pointing downwardly into said nozzle slot for introducing propellant gas into said slot, said slits being arranged at the same level in said nozzle halves and at a vertical distance of between 8 mm and 15 mm below said exit orifices;
   said nozzle slot having a horizontal width between 6 mm and 15 mm and a vertical length between 5 mm and 80 mm;
   a vertical chute arranged beneath said blast nozzle unit to receive fibers emerging therefrom; and
   a conveyor belt arranged beneath said chute to receive fibers emerging therefrom and transport away a continuous web of fibers.

2. The apparatus of claim 1 further comprising an air guide lip adjacent said blow-in slit and projecting into said nozzle slot at least 0.5 mm to provide a constriction in the cross-section of said nozzle slot.

* * * * *